Sept. 8, 1970     D. J. MORROW     3,527,426
DUAL DEWINDER AND REWINDER MACHINE

Filed June 4, 1968                        2 Sheets-Sheet 1

INVENTOR
DONALD J. MORROW
BY Beale and Jones ATTORNEYS

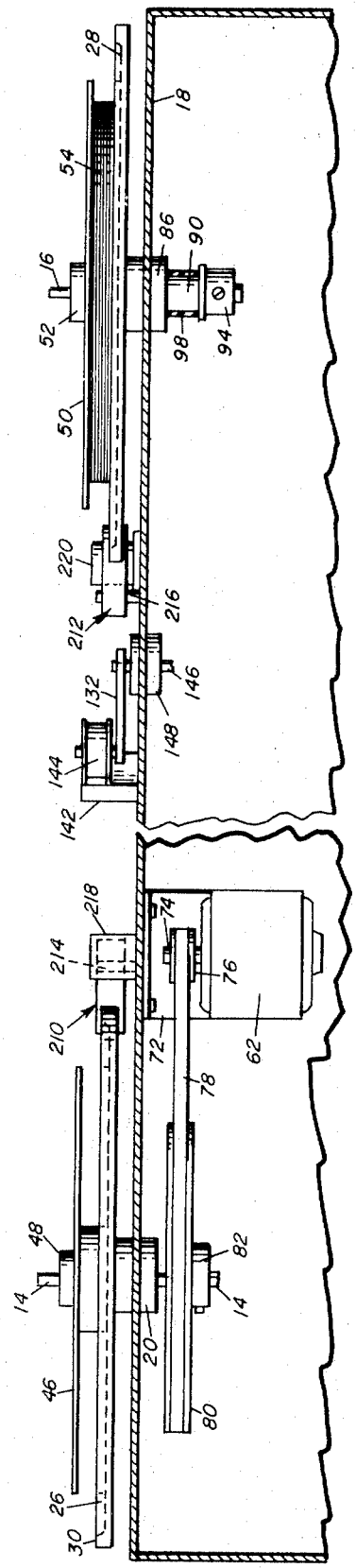

United States Patent Office 3,527,426
Patented Sept. 8, 1970

3,527,426
DUAL DEWINDER AND REWINDER MACHINE
Donald J. Morrow, Cottage 208, Intermountain School,
Brigham City, Utah 84302
Filed June 4, 1968, Ser. No. 734,475
Int. Cl. B65h 59/38; G03b 1/04; G11b 15/32
U.S. Cl. 242—190                 14 Claims

ABSTRACT OF THE DISCLOSURE

A machine is disclosed for processing and inspecting motion picture film. The machine includes two sections, each including a pair of reel spindles, one of which is driven by an electric motor to draw the film from a feed reel to a take-up reel. A dancer roll rides on and is supported by the film in a position between the two reels. Upon film breakage or at the end of the film, the dancer roll drops, activating a switch which cuts the power to the drive motor and operates friction brakes on both reel spindles to stop the reel rotation instantaneously, thus preventing damage to the film or film leader strips.

FIELD OF THE INVENTION

The present invention relates, in general, to improved control mechanisms for film dewinders and rewinders, and more particularly relates to apparatus for automatically shutting off the drive motor for dewinder apparatus and activating a brake mechanism in response to breakage in the film or upon reaching the end of the film.

DESCRIPTION OF THE PRIOR ART

In large film distribution centers such as motion picture film libraries, film maintenance is a highly important, but very time consuming and expensive proposition. To maintain film quality, and to insure that each film is in the best projectionable condition when it is sent out to users, each film must be inspected upon return by the user. To handle the volume of films circulated by a good sized library, inspection must be done electronically, and this requires that the film move past the electronic inspection station from a "tail" or projected position to the "head" or projectionable position. Since most films are received from the users in a rewound or a projectable position, dewinding is necessary before electronic inspection can take place. In a typical film library, approximately 85 percent of all film received from the field must be dewound; thus, in a film library of about 5,000 or 6,000 films with a continuing and active circulation, 2,500 films per month or more may require dewinding.

Such a work load puts a great strain on the manpower supply in the average film circulating department or library, for commercial equipment presently available is too slow to handle this much dewinding. For the example given above, it may be necessary to use as many as six commercially available dewinding machines at the same time to keep up with the backlog, and thus six employees are required merely to dewind film. With such a manpower requirement, taken with the film and leader breakage that results from usage of present machines, it may be seen that the expense involved in this operation is a major one.

The difficulties with presently-available machines lie in the fact that the operator is required to control the speed of the take-up reel drive motor with a foot operated power control, while at the same time operating the feed roll tension brake with one hand to insure that the feed roll does not overrun the take-up reel. Usually the operator must hold in the other hand something with which to catch the film leader strip upon completion of the dewinding operation, in order to prevent the leader from flying loose around the take-up reel until the drive motor can be slowed to a stop. These machines often damage the film leader strips because of the slow stopping time, and this requires that new leaders be spliced onto the film. The time required for this and for the printing of new titles on the new leaders are a further expense. In addition, many of these machines are dangerous and present a safety hazard to operators who sometimes suffer cut fingers trying to stop rapidly spinning reels at the end of the dewind, or in the event of film breakage. Machine operators are sometimes able to diminish the losses caused by leader strip breakage by slowing down the operation of the machine as the end of a reel is approached; however, the resultant gradual slowing down materially extends the length of time required to dewind a reel. Further, slowing down at the end of a reel does not prevent film losses due to the ends of the film flying loose around the take-up reel when the film breaks during the dewinding process, and such breakage often causes the loss of a great deal of film, increasing the cost of dewinding. In order to minimize losses due to this type of breakage, operators often slow down the dewinding process, thus further extending the time required to dewind a reel. Finally, a machine operator cannot leave present machines during a dewinding operation to prepare the next reel for dewinding, thus causing considerable delay between each operation.

Numerous film rewinding devices have been proposed by the prior art, but none of these machines have been able to overcome the various disadvantages described hereinabove. Many of these prior art machines are simply not fast enough to handle the volume of material required for active film library operation. Others are complex and expensive machines which require considerable maintenance and thus, again, are not suitable for the type of operation required by film libraries. Others are essentially scanning machines which operate at scanning speeds or which are limited in the size and weight of reels which they can handle and thus, as a practical matter, are not adaptable to high speed film dewinding and rewinding.

SUMMARY OF THE INVENTION

It is therefore an object of the present invention to provide an automatic film dewinder which is mechanically simple in structure, allows full speed dewinding throughout the length of the film with instant stoppage upon breakage of the film or upon reaching the end of the film.

It is a further object of the invention to provide a dual dewinding machine for simultaneous dewinding of two films, whereby when one section of the machine is dewinding a film, the operator can be loading the other section, the machine operating at such a high speed that by the time the second section is loaded, the first section has been dewound.

It is an additional object of the invention to provide a dual rewinder and dewinder machine for motion picture film which is simple to operate, reduces the number of personnel required for the dewinding operation in film libraries and the like, reduces film damage, is mechanically rugged, which is relatively inexpensive to manufacture, and which thus substantially reduces the operating cost of film circulating centers, libraries, or the like.

The disadvantages of prior art devices are overcome by the present invention through the provision of a dual dewinding and rewinding machine which consists of upper and lower winding sections, each of which responds automatically to breakage in its respective film or to the end thereof to bring its corresponding drive motor to a stop and apply corresponding friction brakes to the reels. Each section comprises a feed spindle and a take-up spindle mounted on a deck and adapted to receive feed and take-up reels, with drive motor means for rotating the take-up spindle to unwind a web from the feed reel. Each spindle preferably carries a reel stabilizer plate against which the feed reel and take up reel are mounted for rotation. Solenoid operated friction brakes are provided for each spindle, and preferably are located adjacent the circumference of their corresponding reel stabilizer plates. A dancer roll located between the reels rests on the film web extending between the reels and is supported in an upper position thereby during dewinding. The dancer carries a position-responsive switch which is in circuit with the drive motor and the solenoid-operated brake means. Upon breakage of the film or at the end of the film, the dancer roll is no longer supported in its upper position by the web and will fall to a lower position, operating the switch means to de-energize the drive motor and the solenoids of the brake means, thereby applying the brakes against the circumference of their corresponding reel stabilizer plates and bringing the reels to a substantially instantaneous stop.

This automatic operation permits the operator to handle two sections at one time; when one section is dewinding, the operator can be loading the other section. The machine operates at such a high speed that by the time the second section is loaded, the first section has been dewound. At normal speed, the machine will dewind more than 100 800-foot reels per hour, although its capacity is twice that. The high potential speed of the device provides a machine that will dewind film faster than an operator can work. However, at normal speeds, the average operator can handle the two sections and will fall into a routine of operation which prevents too high a speed of film, but keeps the operator working continuously. Thus, the operator will gradually work up to his optimum speed.

By keeping the operator working at all times, the backlog is handled more rapidly and efficiently, resulting not only in faster and better service to the film users, but releasing library personnel for other necessary tasks. It has been found that a single machine made in accordance with the present invention is capable of replacing six prior dewinding machines and thus permitting a reduction in force of five operators. Additional savings are effected by the present machine in that there is reduced breakage of film and leaders, and, by reason of its rugged and simple construction, the machine provides a much longer life to expectancy than prior devices. In two and one half to three hours, the present machine can handle the number of films that required six people two or three days to handle with prior machines.

BRIEF DESCRIPTION OF THE DRAWINGS

The novel features which are characteristic of the present invention are set forth with particularity in the appended claims, but the invention will be understood more clearly and fully from the following detailed description of a preferred embodiment thereof, as set forth in connection with the accompanying drawings, in which:

FIG. 3 is a partial top view of the invention, showing the method of mounting and driving one of the take-up reels;

FIG. 4 is an alternative method of mounting the solenoid brake actuator; and

FIG. 5 is a schematic diagram of the electric circuitry used in the machine of FIG. 1.

DESCRIPTION OF THE PREFERRED EMBODIMENTS

Figure 1:
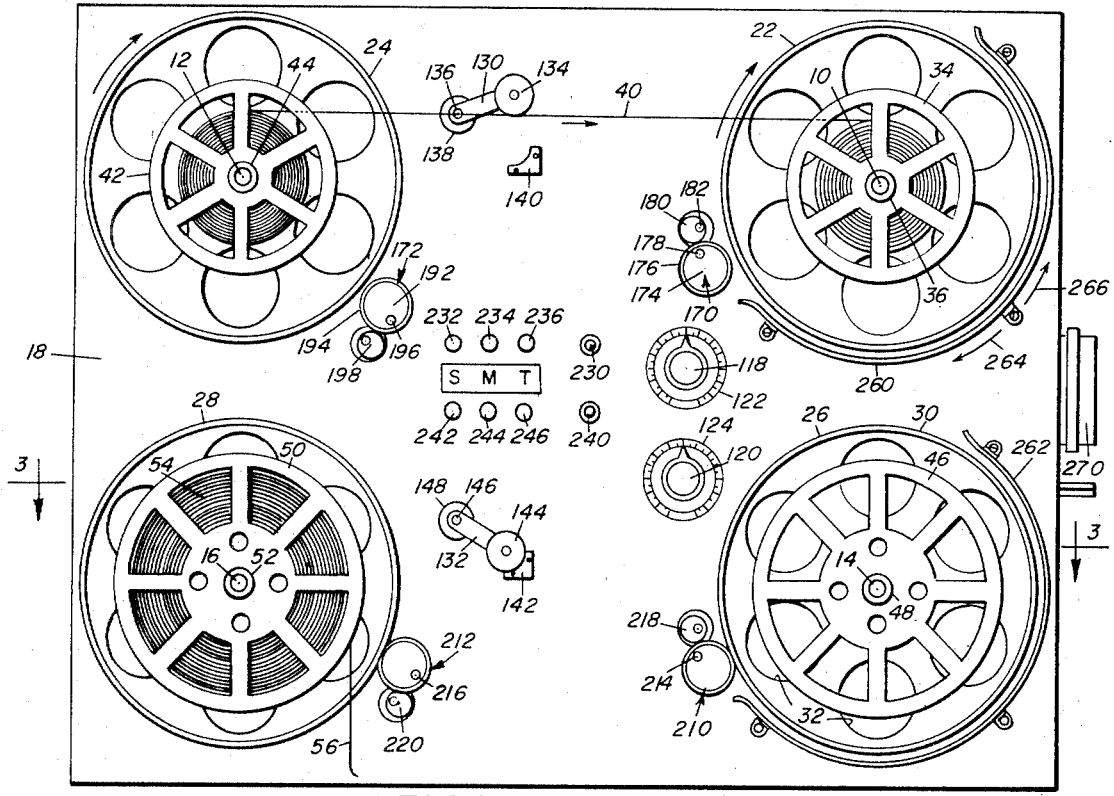
FIG. 1 is a diagrammatic front view of a dual dewind-rewind machine constructed in accordance with the present invention.

Turning now to a consideration of FIG. 1, there is illustrated a film dewinder-rewinder machine constructed in accordance with the present invention and comprising a first take up spindle 10, and a first feed spindle 12 which, with their associated components make up a first section of the machine. A second take up spindle 14 and a second feed spindle 16, with their associated components, comprises a second section of the machine. The several spindles are journalled in a machine deck 18 shown in front view in FIG. 1 and in rear view in FIG. 2. Means for journalling the shaft in the deck may be of any suitable type and preferably includes bearing means for permitting high velocity rotation of the spindles. FIG. 3 illustrates a journal means 20 for supporting spindle 14 in the deck.

Each spindle carries a large reel stabilizer plate which may be keyed to its respective spindle for rotation therewith; thus, spindles 10, 12, 14 and 16 carry respective stabilizer plates 22, 24, 26 and 28. These plates receive and support the film reels to provide stability at the high speeds at which the present machine is designed to operate. The plates may be of cast aluminum or the like and may include a thickened edge portion 30 and a plurality of openings 32, as indicated on stabilizer plate 26, to provide the desired weight and balance. The thickened edge portion 30 also serves as a braking surface, as will be described. It will be apparent that the stabilizer plates must be carefully made to avoid heavy spots or other imbalances which would cause vibrations, for such vibrations would tend to wear out the spindle bearings and reduce the life of the machine, as well as adversely affecting the braking action.

A take up reel 34 is illustrated in position on spindle 10. This reel is held in place on its spindle for rotation therewith by conventional key means or conventional reel fastener 36 which locks the reel onto the spindle. As shown, reel 34 is receiving a motion picture film or other web 40 from a supply reel 42 which is fixed to spindle 12 by suitable key means or conventional fastener means 44. In similar fashion, a take-up reel 46 is mounted on spindle 14 by means of a fastener 48 and a supply reel 50 is mounted on spindle 16 by a suitable fastening means 52 in the lower section of the machine. Supply reel 50 carries a film 54, having a suitable leader 56, which is to be dewound onto reel 46. As illustrated in FIG. 3, the reels are held firmly against their corresponding stabilizer plates by the spindle fastening means to assure smooth rotation of the reel.

Figure 2:
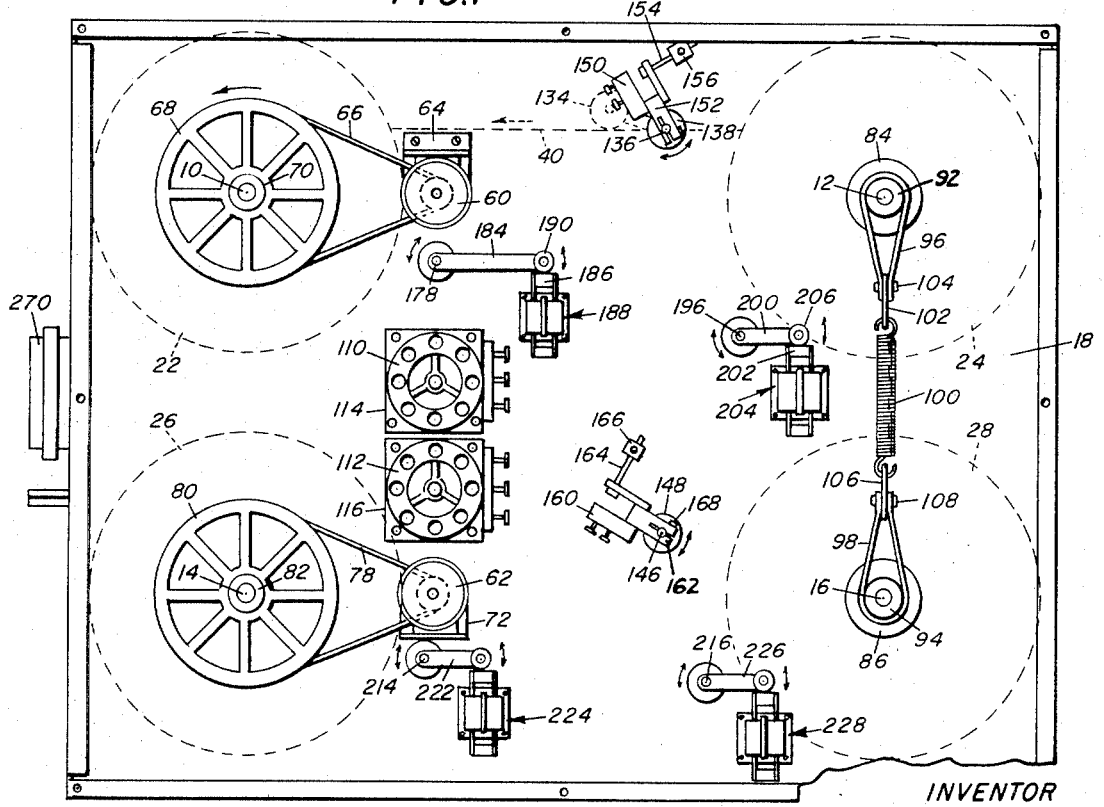
FIG. 2 is a diagrammatic rear view of the machine of FIG. 1.

Viewed from the rear of deck 18, as in FIG. 2, take-up spindles 10 and 14 are seen to be driven by individual and corresponding drive motors 60 and 62. Motor 60 is mounted on the back of deck 18 by means of an L-shaped bracket 64. The motor shaft (not shown) carries a pulley and a drive belt 66 by means of which spindle 10 is driven. The spindle carries a large spindle pulley 68 which may be keyed onto the spindle or held thereon by a suitable fastener 70. The spindle pulley may be of any conventional type or material, although nylon is preferred, and will be of a size to provide the desired rotational speed for the spindle.

In similar manner, drive motor 62 is carried by a suitable mounting bracket 72 which is also L-shaped and fastened to the mounting deck 18. As further illustrated in the top view of FIG. 3, the shaft 74 of motor 62 carries a drive pulley 76 which, by means of belt 78 and spindle pulley 80, drives the take-up spindle 14. Spindle pulley 80 may be keyed onto spindle 14 for rotation therewith, or may be otherwise held in place by a suitable fastener 82.

As shown in FIG. 2, feed spindles 12 and 16 are carried in panel 18 by means of journal bearings 84 and 86, respectively, and each spindle carries a drag brake drum, as illustrated in FIG. 3 at 90. The drag brake drum is mounted on its corresponding shaft for rotation therewith, and may be so mounted in any convenient manner. For example, this brake drum may be a separate element keyed onto its spindle, may be held on the spindle as by means of fasteners 92 and 94, or may be formed as an integral part of the respective fasteners. The fastener may be held in place by a set screw or the like, as is known in the art.

The drag brake drums on feed spindles 12 and 16 are adapted to receive drag brake means tensioned between the two spindles to exert a drag force on these spindles and which tends to maintain a tension in the film web as it is being transferred from the feed reel to the take-up reel during dewinding. The drag brake means comprises a first friction loop 96 around the brake drum of spindle 12 and a second friction loop 98 around the brake drum 90 of spindle 16. The friction loops may be strips of conventional brake lining material such as is used in automotive brakes, or any other suitable material which can withstand the continuous friction contact with the rotating brake drums. The two ends of the friction loop 96 are brought together and fastened to the upper end of a tension spring 100 by any suitable means. For example, a metal plate 102 may be interposed between the ends of strip 96 and fastened to the strip by means of a bolt 104 or the like. The lower end of plate 102 may be provided with a hole or a slot to receive the upper end of spring 100. In similar manner, the ends of loop 98 are brought together and fastened to a metal plate 106 by means of a bolt 108, with the lower end of tension spring 100 being fastened to plate 106. The tension of spring 100 then regulates the frictional drag on the spindles 12 and 16 and thus regulates the tension exerted on the web passing from the feed reel to the take-up reel. This tension regulates the tightness with which the web is wound on the take-up reel, as is known in the art. Through the use of a single tension drag brake on the two feed spindles, equal winding tension may be obtained in both the upper and lower sections of the dewinder machine.

Drive motors 60 and 62 preferably are rated at approximately one tenth horsepower each, and each has a rated speed of approximately 785 r.p.m. This speed is regulated by variable transformers 110 and 112, connected in circuit with motors 60 and 62 respectively, as will be described. The transformers are fastened to machine deck 18, as by mounting plates 114 and 116, respectively, and include control shafts which extend through the deck to carry control indicator knobs 118 and 120. Dial plates 122 and 124, respectively, provide an indication of the transformer setting, and thus of the motor speed. The location of the indicator and control knobs 118 and 120 on the face of deck 18 is such as to provide convenient and readily accessible control of the motor speed.

In order to prevent damage to the film web being transferred from the feed reel to the take-up reel, a reel stopping mechanism is provided to respond to any break in the film or to the completion of the winding operation. The reel stopping mechanism comprises a web sensing arm 130 associated with reel spindles 10 and 12, and a web sensing arm 132 associated with reel spindles 14 and 16. Web sensing arm 130 carries a stopping roller 134 which is rotatably mounted on arm 130 and adapted to ride on film web 40 as it passes from supply reel 42 to take-up reel 34. Arm 130 is pivotally mounted on deck 18 by a shaft 136 which extends through the deck and is supported therein by journal means 138. The tension produced in web 40 during winding by the drag brake mechanism and the drive motor is sufficient to support the weight of stopping roller 134 and sensing arm 130, thus holding the sensing arm in an upper position as indicated in FIG. 1. Any substantial reduction in the tension of web 40, such as would be caused when the end of the web pulls off of supply reel 42 or when web 40 breaks, would cause arm 130 to fall to its lowermost position. Downward motion of arm 130 is limited by limit block 140.

It will be noted that arm 130 will experience a certain amount of motion as a result of the decreasing diameter of the film on supply reel 42 as the dewinding progresses; however, this normal motion will not activate the reel stopping mechanism. Such normal motion may be minimized by placing roller 134 approximately midway between the supply and take-up reels, whereby the decreasing diameter of the film on reel 42 will be compensated by the increasing diameter on reel 34. Web sensing arm 132 is shown in its lowermost position, with arm 132 resting on its corresponding limiting block 142. Arm 132 carries a stopping roller 144 and is mounted in deck 18 by means of a shaft 146 carried by a journal means 148.

Shaft 136 of the web sensing arm carries a position responsive switch 150 (FIG. 2) which serves to activate the friction brakes associated with spindles 10 and 12 upon breakage or termination of the film web. Switch 150 preferably is a mercury type switch which reacts very quickly to a predetermined change in position to open or close its associated circuitry. This switch is mounted on shaft 136 by means of a mounting bar 152 which is clamped onto shaft 136 or otherwise suitably affixed. The mercury switch is carried in a bracket on mounting bar 152 for easy replacement of the switch when required. Also carried by the mounting bar 152 is a balancing arm 154 which carries a slidable counterweight 156 which may be fixed on the balancing arm by means of a set screw. Adjustment of the position of counterweight 156 permits compensation of the counterclockwise moment arm produced about shaft 136 (as viewed in FIG. 2) by the weight of switch 150, mounting bar 152, web sensing arm 130 and stopping roller 134, thus permitting roller 134 to rest on the film web 40 with the minimum amount of weight consistent with a fast reaction time of the sensing arm in the event of a break. Roller 134 must rest heavily enough on the moving film web so that vibration and flexing of the moving web does not cause it to bounce, but the weight should not be so great as to damage the film. When the film web is in position for dewinding, and sensing arm 130 is in its upper position, counterweight 156 preferably is on the opposite side of a vertical plane passing through shaft 136 than is the roller 134, to counterbalance the moment arms about shaft 136. However, it is preferred that the counterbalance 156 be sufficiently close to that vertical plane that when the web sensing arm 130 falls to its lowermost position, weight 156 passes over to the same side of the plane as roller 134, thus adding its weight to that of the roller and insuring a positive reaction to film breakage or termination. This latter condition is illustrated with regard to the reel stopping mechanism in the lower section of the dewinder machine, where web sensing arm 132 is illustrated in its lowermost, or stopping, position. As illustrated in FIG. 2, the shaft 146 which carries web sensing arm 132 also carries a second position sensing switch 160 carried by a mounting bar 162 which is affixed to shaft 146. A balancing arm 164 is also carried by mounting bar 162, and a slidable counterweight 166 is positioned on balancing arm 164 by means of a suitable set screw. As is the case with mounting bar 152, bar 162 is adjustably positioned on shaft 146, with clamping screw 168 permitting angular adjustment of the mounting bar with respect to web sensing arm 132.

Mercury switch 150 controls the reel stopping mechanism associated with spindles 10 and 12. This mechanism includes a pair of brake discs 170 and 172 located adjacent the stabilizer plates 22 and 24, respectively, which are carried by respective spindles 10 and 12. Brake disc 170 comprises a hub portion 174 carrying an annular friction brake material 176 which may be of rubber or the like. Brake disc 170 is eccentrically mounted on brake shaft 178 for rotation toward and away from the circumference of reel stabilizer plate 22. Immediately adjacent the disc 170 is an eccentrically mounted brake post 180 which provides a stationary base against which disc 170 is urged by stabilizer plate 22 during the stopping operation. Thus, when disc 170 is rotated into contact with plate 22, the motion of plate 22 tends to twist disc 170 about its shaft 178. This motion tends to force the disc into the space between the edge of plate 22 and brake post 180, and this wedging action brings the reel to an immediate stop. Brake post 180 may be metal, but preferably includes a hard rubber portion which provides a good friction surface for the circumference of disc 170. By mounting the brake post 180 eccentrically, as by means of a machine screw or bolt 182, the force of the braking operation can be adjusted.

Rotation of disc 170 into contact with the braking surface of stabilizer plate 22 is accomplished by a lever arm 184 carried by shaft 178 at the rear of deck 18. Both disc 170 and lever arm 184 preferably are keyed onto shaft 178 for positive rotation therewith. The position of lever arm 184 is controlled by the movable armature 186 of a solenoid 188. When energized, solenoid 188 moves armature 186 upwardly, as viewed in FIG. 2, with the upper end of the armature abutting against a relatively heavy weight 190 carried by lever arm 184. When in this energized position, disc 170 is rotated away from contact with the circumference of reel stabilizer plate 22, and this is the normal, or running condition. De-energizing of the solenoid allows armature 186 to drop down, and this, in turn, allows weight 190 to rotate lever arm 184 in a clockwise direction (as viewed in FIG. 2), thus bringing disc 170 into contact with plate 22. The energization of solenoid 188 is controlled by mercury switch 150, which is responsive to the position of web sensing arm 130.

Brake disc 172 is similar to disc 170 and comprises a hub portion 192 and a rubber circumferential portion 194. The disc is eccentrically mounted on a shaft 196 for rotation toward and away from the circumference of stabilizer plate 24. A brake post 198 is located adjacent disc 172 to assist in stopping the rotation of plate 24 upon movement of disc 172 against the circumference of the plate. Disc 172 is moved by means of a lever arm 200 attached to shaft 196, the position of the lever arm being controlled by the armature 202 of solenoid 204. Armature 202 abuts against weight 206 carried by lever arm 200, whereby energization of solenoid 204 holds the lever arm 200 in its uppermost position, which rotates disc 172 away from contact with plate 24, while de-energization of solenoid 204 permits armature 202 to fall, allowing weight 206 to move disc 172 into contact with plate 24. Solenoid 204 is also controlled by position sensing switch 150.

Brake discs 210 and 212 are associated with reel spindles 14 and 16, respectively, and are adapted to be moved into contact with the circumference of reel stabilizer plates 26 and 28, respectively, when rotated about their corresponding eccentrically mounted shafts 214 and 216. Respective brake posts 218 and 220 assist discs 210 and 212 in stopping the rotation of plates 26 and 28. Movement of disc 210 toward and away from stabilizer plate 26 is controlled by a lever arm 222, the position of which is, in turn, controlled by solenoid 224 in the manner heretofore described. The position of disc 212 similarly is controlled by lever arm 226 and solenoid 228. The energization of solenoids 224 and 228 is under the control of mercury switch 160.

The operation of the present device will be apparent from the foregoing, taken in conjunction with the circuit diagram of FIG. 5. To start the device, the operator places supply reel 42 on its stabilizer plate 24 and an empty take-up reel 34 on stabilizer plate 22. The leader on film strip 40 is then connected to reel 34, with the portion of the web which then extends between the two reels passing under roller 134. As long as web 40 is slack, sensing arm 130 will be in its lowermost position and mercury switch 150 will be open, de-energizing solenoids 188 and 204. Thus, brake discs 170 and 172 will be pressed against stabilizer plates 22 and 24. On-off switch 230, which may be a push-push type switch mounted on deck 18, may then be depressed to permit operation of the divec. However, with arm 130 down, mercury switch 150 remains open and neither the motor 60 nor the solenoids 188 and 204 will be energized, as will be seen in FIG. 5. Variable transformer 110 may then be set to the desired speed and the machine may be started merely by turning one of the reels to remove the slack from web 40. This raises the stopping roller 134 and web sensing arm 130, closing mercury switch 150 and energizing motor 60 and solenoids 188 and 204. The motor will remain energized as long as web 40 remains taut, but any unusual slackening of the web, breakage in the web, or termination of the web will immediately result in opening of mercury switch 150 and activation of the reel stopping mechanism. The friction drag brake on spindle 12 serves to prevent slackening of the web due to variations in speed of the reel so that in general the only stoppages will be due to breakage or termination of the film. It will be noted in FIG. 5 that fuses 232, 234 and 236 are provided in the solenoid, motor and transformer circuits, respectively. These fuses are located on deck 18 for ready accessibility.

The lower section of the dewinder machine operates in a manner similar to the upper portion, and is energized by on-off switch 240. With arm 132 in the lowermost position illustrated in FIG. 1, mercury switch 160 remains open so that motor 62 and solenoids 224 and 228 remain de-energized. In this condition, brake discs 210 and 212 are pressed against stabilizer plates 26 and 28, as illustrated. Again, the solenoid, motor and transformer circuits for the lower section are fused by means of corresponding fuses 242, 244 and 246.

Although gravity operated solenoid and lever arm mechanisms are illustrated, whereby weights are required to bias the brake discs toward contact with the stabilizer plates upon de-energization of the corresponding solenoids, it will be apparent that other solenoid-operated lever arm arrangements will be possible. For txample, FIG. 4 illustrates one modification wherein lever arm 184' is urged in one direction by the armature 186' of solenoid 188', while being urged in the opposite direction by means of a steel leaf spring 250 supported in place by suitable posts or other means 252 and 254. Upon energization of solenoid 188', armature 186' urges lever arm 184' in a direction to release its corresponding brake disc; de-energization of the solenoid permits leaf spring 250 to move the lever arm in a direction to bring about the required braking action. It will be noted that by mounting the brake discs closely adjacent their corresponding stabilizer plates, only a very small motion of their corresponding lever arms is required to effect operation. This permits a very fast response to the condition of the film web, and allows almost immediate stopping of the reels upon occurrence of a brake or at the end of the film.

Although the rotation of the reels is stopped very quickly by the braking mechanism of the present invention, nevertheless there will be some rotation of the take-up reels between the time that web sensing arm 130 or 132 starts to fall, due to breakage of the film strip or upon reaching the end of the film during the dewinding process, and the time at which the take-up reel has been completely stopped. During this last revolution or so, the end of the film will be loose, and will tend to fly out from the reel. If this end portion strikes some object, or is unduly flexed even without striking anything, the end portion can become damaged. Therefore, it has been found desirable to restrict such end portion, and for this purpose film guards 260 and 262 are provided adjacent the periphery of take-up reel stabilizer plates 22 and 26, respectively. These web guards are arranged to extend a substantial distance around the periphery of the reels to provide as much of a closed path as possible for the film end. This guard is lined with felt or the like to prevent scratching of the film, and preferably is made adjustable so that it may be moved to various positions around the circumference of the reels. The purpose of this adjustability is to allow optimum positioning of the film guard as the speed of the machine is changed. Any desired method of mounting the film guards may be used, but preferably L-shaped brackets, posts or clips may be used to movably support the guard. When small reels of film are being wound at high speed, guard 260 preferably is moved in the direction of the arrow 264, causing the end of the film to remain within the guard limits past the maximum throw out of the centrifugal force of the reel, thus preventing the film end from lashing out against the elements carried on deck 18. When larger reels are used, the guard would be moved in the direction indicated by arrow 266 to prevent the breakage of the film against the guard 260 itself. Guard 262 is similarly adjustable.

One additional feature of the invention remains to be mentioned. For purposes of speed and convenience, tape dispenser 270 is mounted on the side of the dewinder machine. This dispenser carries tape for taping the lead end of the film 40 onto take-up reel 34. The tape helps prevent the film from slipping or cinching on the reel during the sudden braking action. The tape is also convenient for quick repair of any breakage that is found in the reel being dewound.

Thus, there has been described a dewinder machine which permits fast and convenient dewinding of film reels and the like and which provides automatic stopping of the reels at the end of the film strip or upon occurrence of a break therein. The web sensing arm for each section of the machine controls its operation and will automatically start the machine when the film is made taut between the two reels so as to lift the web sensing arm. At the end of the reel, the web sensing arm drops down and automatically stops rotation of both the supply and take-up reels. By controlling the rotation of the reels by means of the web sensing arm in this manner, the main on-off switches are not required during normal operation of the unit; the main switches may be left on until all reels have been dewound. Further, automatic control of stopping allows the speed of rotation of the reels to be regulated to permit most efficient utilization of time, for once a reel is started the operator need pay no further attention to it until it automatically stops. Meanwhile, the operator can be loading and starting the second set of reels on the machine. With proper speed adjustment, one reel can be dewound during the time a second reel is being placed in position on the machine and started. While the second reel is being dewound, the first reel may be removed from the first section of the machine and a third reel placed in position and started. Thus, the operator can find a routine suited to his working speed, thereby keeping the machine operating at the maximum rate he can handle, and by this means substantially eliminate lost motion in the rewinding process. Although the invention has been shown in its preferred embodiments, it will be apparent to those skilled in the art that numerous changes and modifications can be made without departing from the spirit and scope of the inventive concept. It is therefore desired that the foregoing be taken as illustrative and limited only by the following claims.

I claim:

1. In a dual dewinding and rewinding machine, a first feed spindle and a first take-up spindle mounted on a deck; reel means mounted on said spindles; drive motor means for rotating said take-up spindle to unwind a web from said feed spindle reel and wind said web on said take-up spindle reel; electrically-controlled reel stopping means adjacent each of said feed and take-up spindles; web sensing means comprising a web sensing arm pivotally carried between an upper position and a lower position by a sensing shaft mounted on said deck; stopping means carried by said web sensing arm and adapted to be supported by the portion of said web extending between said reels to hold said web sensing arm in said upper position; position-sensing switch means carried by said sensing shaft, said switch having a first condition when said web sensing arm is in said upper position and a second condition when said web sensing arm is in said lower position, said switch means being in circuit with said drive motor means and said reel stopping means, whereby when said web sensing means falls to said lower position in response to the end of said web or breakage in the web, said switch means changes to said second condition to de-energize said drive motor and the electrically-controlled reel-stopping means, thereby stopping the rotation of said spindles substantially instantaneously.

2. The dewinding machine of claim 1, wherein each of said reel-stopping means includes a braking surface adapted for rotation with a corresponding spindle, friction brake means mounted adjacent said braking surface and adapted for rotational motion toward said braking surface, lever arm means for effecting rotational motion of said friction brake means, means for biasing said friction brake means towards said braking surface, and electrically-operated means for holding said friction brake means away from said braking surface.

3. The dewinding machine of claim 2, wherein said friction brake means comprises a brake disc eccentrically mounted for rotation on a shaft, said lever arm being also mounted on said shaft, said reel-stopping means further including brake post means adjacent said brake disc and spaced from said braking surface, whereby rotation of said brake disc about said shaft and into contact with said braking surface while said spindle is rotating during a dewinding operation tends to wedge said brake disc into the space between said braking surface and said brake post, thereby stopping rotation of said braking surface.

4. The dewinding machine of claim 2, wherein said electrically-operated means comprises a solenoid having a movable armature adapted to engage said lever arm, whereby energization of said solenoid moves said lever arm in opposition to said means for biasing, and holds said fraction brake means away from said braking surface.

5. The dewinding machine of claim 2, wherein said means for biasing said friction brake is a weight mounted on said lever arm, whereby said friction brake is gravity-operated upon de-energization of said electrically-operated means.

6. The dewinding machine of claim 2, wherein said means for biasing said friction brake comprises spring means urging said lever arm in a direction to rotate said friction brake means toward said braking surface.

7. The dewinder of claim 3, wherein said electrically-operated means comprises a solenoid having a movable armature adapted to engage said lever arm, whereby energization of said solenoid moves said lever arm against said means for biasing, and holds said friction brake means away from said braking surface.

8. The dewinding machine of claim 7, wherein said braking surface comprises a stabilizer plate carried by said corresponding spindle.

9. The dewinder of claim 8, further including tension drag brake means for said feed spindle.

10. The dewinding machine of claim 1, further including adjustable counterbalancing means carried by said sensing shaft to adjust the response of said web sensing arm to a break in said web and to the termination of said web.

11. The dewinding machine of claim 2, wherein said electrically-operated means comprises a solenoid having a movable armature adapted to engage said lever arm, whereby energization of said solenoid when said switch is in said first condition moves said lever arm in opposition to said means for biasing and holds said friction brake means away from said braking surface, movement of said switch to said second condition deenergizing said solenoid to permit said means for biasing to move said friction brake into contact with said braking surface.

12. The dewinding machine of claim 1, further including adjustable web guard means adjacent the periphery of said reel means mounted on said take-up spindle.

13. The dewinding machine of claim 1, further including second feed spindle and second take-up spindle means mounted on said deck; second reel means mounted on said second spindles, second drive motor means for rotating said second take-up spindle to unwind a second web from said second feed spindle reel and wind said second web on said second take-up spindle reel; second electrically-controlled reel stopping means adjacent each of said second feed and second take-up spindles; second web sensing means adapted to be supported by the portion of said second web extending between said second reels; second position-sensing switch means carried by said second web-sensing means, said second switch mean being in circuit with said second drive motor means and said second reel stopping means, whereby a change in the position of said second web-sensing means in response to the end of said second web or breakage in said second web opens said second switch means to de-energize said second drive motor and the second electrically-controlled reel stopping means, thereby stopping rotation of said second feed and second take-up spindles substantially instantaneously; and tension drag brake means connected between said first feed spindle and said second feed spindle to regulate the tension in said first and second webs during dewinding.

14. The dewinding machine of claim 13, wherein said first and second webs are comprised of motion picture film.

References Cited
UNITED STATES PATENTS

| | | | |
|---|---|---|---|
| 2,939,972 | 6/1960 | Wallace et al. | 310—112 |
| 3,156,424 | 11/1964 | Namenyi-Katz | 242—55.12 |

LEONARD D. CHRISTIAN, Primary Examiner

U.S. Cl. X.R.

242—57